US010083579B2

(12) United States Patent
Sekiyama

(10) Patent No.: US 10,083,579 B2
(45) Date of Patent: Sep. 25, 2018

(54) ELECTRONIC DEVICE AND METHOD FOR CONTROLLING ELECTRONIC DEVICE

(71) Applicant: ICOM INCORPORATED, Osaka-shi, Osaka (JP)

(72) Inventor: Yoshio Sekiyama, Osaka (JP)

(73) Assignee: ICOM INCORPORATED, Osaka-shi, Osaka (JP)

( * ) Notice: Subject to any disclaimer, the term of this patent is extended or adjusted under 35 U.S.C. 154(b) by 2 days.

(21) Appl. No.: 15/138,832

(22) Filed: Apr. 26, 2016

(65) Prior Publication Data

US 2017/0024982 A1 Jan. 26, 2017

(30) Foreign Application Priority Data

Apr. 30, 2015 (JP) .................... 2015-93452

(51) Int. Cl.
| | |
|---|---|
| *G08B 7/06* | (2006.01) |
| *H05B 37/02* | (2006.01) |
| *H05B 33/08* | (2006.01) |
| *H02J 4/00* | (2006.01) |
| *G08B 5/36* | (2006.01) |
| *G08B 21/20* | (2006.01) |

(52) U.S. Cl.
CPC ............... *G08B 7/06* (2013.01); *G08B 5/36* (2013.01); *G08B 21/20* (2013.01); *H02J 4/00* (2013.01); *H05B 33/0854* (2013.01); *H05B 37/0227* (2013.01)

(58) Field of Classification Search
CPC .. G08B 21/20; G08B 5/36; G08B 7/06; H02J 4/00; H05B 33/0854; H05B 37/0227

USPC .......................................................... 340/540
See application file for complete search history.

(56) References Cited

U.S. PATENT DOCUMENTS

| | | | | |
|---|---|---|---|---|
| 4,796,167 A | * | 1/1989 | Brown ...................... | B63C 9/21 116/DIG. 7 |
| 6,157,303 A | * | 12/2000 | Bodie .................. | G08B 21/088 340/539.1 |
| 6,476,721 B1 | * | 11/2002 | Diebold ............... | G08B 21/088 340/566 |
| 9,098,992 B2 | | 8/2015 | Sekiyama | |

(Continued)

FOREIGN PATENT DOCUMENTS

JP 04-135038 U 12/1992
JP 2013-229826 A 11/2013

*Primary Examiner* — Nader Bolourchi
(74) *Attorney, Agent, or Firm* — Kilyk & Bowersox, P.L.L.C.

(57) ABSTRACT

An electronic device including a submersion detector, an illuminant provided inside a casing, a lighting circuit, a controller, an unnecessary part that is unnecessary for lighting the illuminant. The submersion detector detects submersion of the electronic device and retrieval of the device. The submersion means that the electronic device falls onto or into water. The retrieval means that the electronic device is retrieved from water. The lighting circuit lights the illuminant in response to an input of a lighting signal. The controller lights the illuminant by generating and outputting the lighting signal to the lighting circuit for a period of time from the submersion at least until the retrieval. In a case where the unnecessary part is supplied with power when the submersion detector detects the submersion, the controller stops the supply of the power to the unnecessary part at least for the above period of time.

17 Claims, 4 Drawing Sheets

(56) References Cited

U.S. PATENT DOCUMENTS

| | | |
|---|---|---|
| 9,461,605 B2 | 10/2016 | Sekiyama |
| 9,560,783 B2 | 1/2017 | Kang et al. |
| 9,854,648 B2 | 12/2017 | Sekiyama |
| 2007/0205905 A1* | 9/2007 | Ford ................... B63C 9/0005 340/573.6 |
| 2009/0295566 A1* | 12/2009 | Weintraub ........... G08B 21/088 340/539.11 |
| 2011/0105100 A1* | 5/2011 | Tanaka ................ H01H 13/702 455/418 |
| 2011/0211331 A1* | 9/2011 | Alkjaer .................... B63C 9/20 362/20 |
| 2013/0285809 A1 | 10/2013 | Sekiyama |
| 2016/0004283 A1* | 1/2016 | Ganguly ............... G06F 1/1656 307/118 |
| 2017/0027041 A1 | 1/2017 | Sekiyama |
| 2017/0155755 A1 | 6/2017 | Kondo |

* cited by examiner

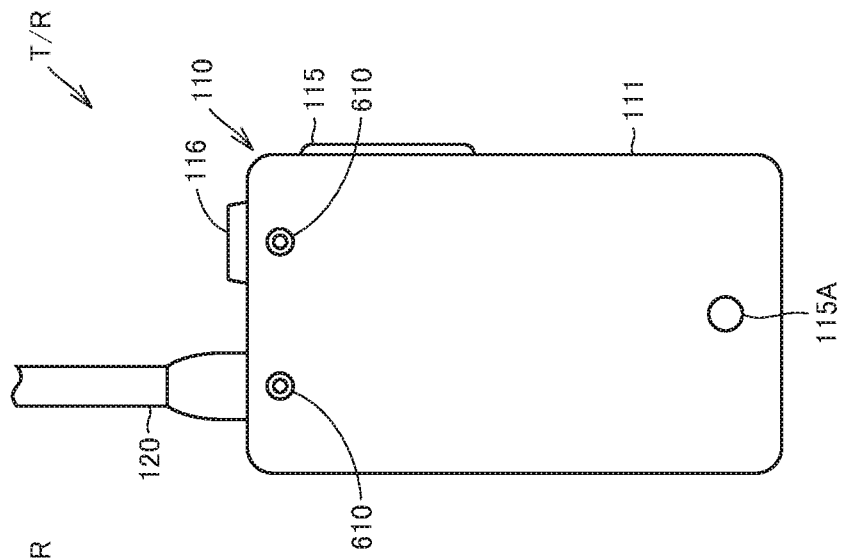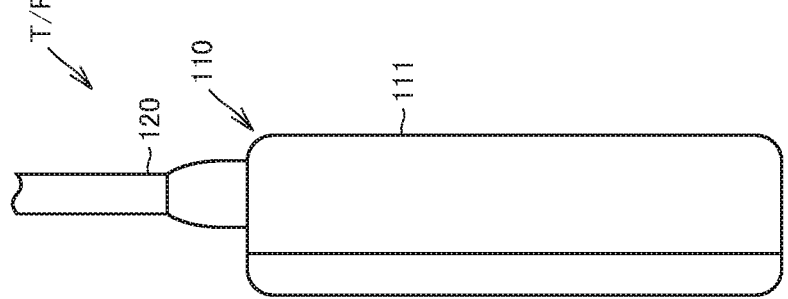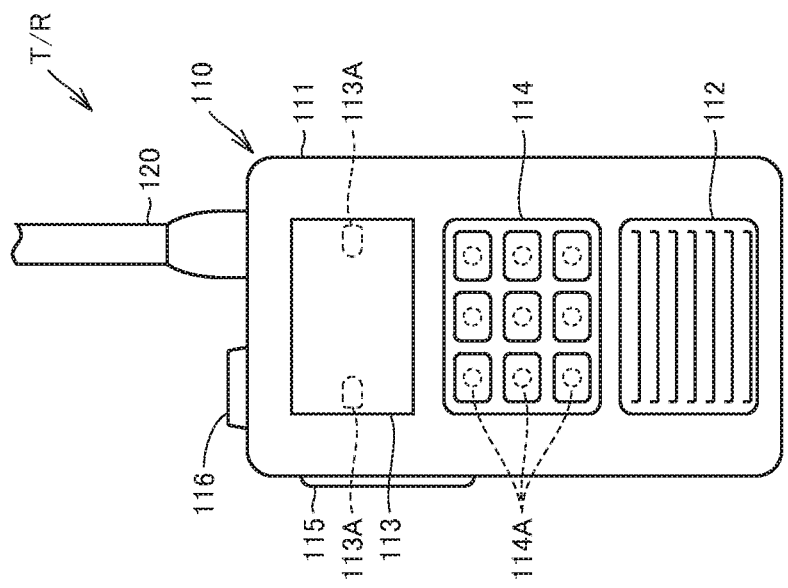

ELECTRONIC DEVICE AND METHOD FOR CONTROLLING ELECTRONIC DEVICE

CROSS-REFERENCE TO RELATED APPLICATION

The present application claims priority under 35 U.S.C. § 119 of Japanese Patent Application No. 2015-93452 filed on Apr. 30, 2015, the disclosure of which is expressly incorporated by reference herein in its entity.

BACKGROUND OF THE INVENTION

Technical Field

The invention relates to electronic devices and methods for controlling electronic devices.

Background Art

Some conventional electronic devices, such as transceivers, are used near water. Anticipation of being accidentally being splashed with water or dropped into water, many of such electronic devices are made watertight to prevent entry of water. Japanese utility model publication No. H04-135038 discloses an electronic device configured to float on water to prevent the electronic device from sinking under water when dropped into water and thereby to allow retrieval of the device.

However, a user may be unable to find and retrieve an electronic device floating on water at nighttime or when visibility is poor. Therefore, the inventor of the present application previously invented an electronic device as disclosed in Japanese patent publication No. 2013-229826 that can be found easily even when it is dropped into water at nighttime or when visibility is poor.

This electronic device includes "a submersion detector for detecting that the electronic device itself falls onto the surface of water or into water (hereinafter referred to as "submersion") and for detecting retrieval of the electronic device from the surface of water or from under water (hereinafter referred to as "retrieval"), a illuminant provided inside a casing, a lighting circuit configured to light the illuminant in response to an input of a lighting signal, a controller configured to flash the illuminant by generating and inputting the lighting signal to the lighting circuit at predetermined flashing intervals for a period of time from the submersion at least until the retrieval, and a power control circuit for supplying power to the controller to activate the controller in a case where power is not supplied to the controller when the submersion detector detects submersion".

In short, the electronic device upon submersion makes the illuminant light up to allow a user to easily find the electronic device if dropped into water at nighttime or when visibility is poor. As for the submersion detector, the illuminant, the lighting circuit, the controller, the power control circuit, Japanese patent publication No. 2013-229826 and its corresponding publication US 2013/0285809 is incorporated herein by reference.

SUMMARY OF INVENTION

However, the above conventional electronic device is configured such that for the period of time from the submersion until the retrieval, power is supplied not only to the illuminant to light it, but also to the communication circuit although the electronic device cannot function as a transceiver during submersion. Electronic devices of this type consume power most in the communication circuit, which means that power is uselessly consumed during submersion. This also hold true for electronic devices other than transceivers, such as mobile phones, radio receivers, and personal computers. This is because electronic devices other than transceivers also cannot be used while submerged.

Under the above circumstances, the invention provides a power-thrifty electronic device that consumes reduced power during submersion.

An electronic device in aspect of the invention includes a submersion detector, an illuminant, a lighting circuit, a lighting circuit, a controller, an unnecessary part that is unnecessary for lighting the illuminant. The submersion detector is configured to detect submersion of the electronic device and detect retrieval of the electronic device. The submersion means that the electronic device itself falls onto a surface of water or into water. The retrieval means that the electronic device itself is retrieved from the surface of the water or from under the water. The illuminant is provided inside a casing. The lighting circuit is configured to light the illuminant in response to an input of a lighting signal. The controller is configured to light the illuminant by generating and outputting the lighting signal to the lighting circuit for a period of time from the submersion at least until the retrieval. The controller is configured such that, in a case where the unnecessary part is supplied with power when the submersion detector detects the submersion, the controller stops the supply of the power to the unnecessary part at least for the period of time between the submersion and the retrieval.

A method for controlling an electronic device in an aspect of the invention includes operating a submersion detector of the electronic device to send a submersion signal to a controller of the electronic device in a case where the submersion detector detects submersion of the electronic device; operating the controller to send a lighting signal, which is for lighting an illuminant provided inside a casing of the electronic device, to a lighting circuit of the electronic device at least until retrieval of the electronic device in a case where the controller receives the submersion signal; operating the lighting circuit to light the illuminant when the lighting circuit receives the lighting signal; and operating the controller to stop power supply to an unnecessary part that is unnecessary for lighting the illuminant at least until the retrieval in a case where power is supplied to the unnecessary part when the submersion detector detects the submersion.

As the electronic device in the above aspect of the invention is configured to light the illuminant when submerged so as to apprise the submersion and the location of the electronic device itself and to stop supply of power to parts other than parts that serves to apprise the submersion and the location, wasteful power consumption can be reduced at parts that cannot be used during submersion.

BRIEF DESCRIPTION OF DRAWINGS

The present invention can be even more fully understood with the reference to the accompanying drawings which are intended to illustrate, not limit, the present invention.

FIGS. 1A to 1C are external views of an electronic device (transceiver) according to an embodiment of the invention, wherein FIG. 1A is a schematic front view, FIG. 1B is a schematic left side view, and FIG. 1C is a schematic back view.

DESCRIPTION OF EMBODIMENT

Figure 2:
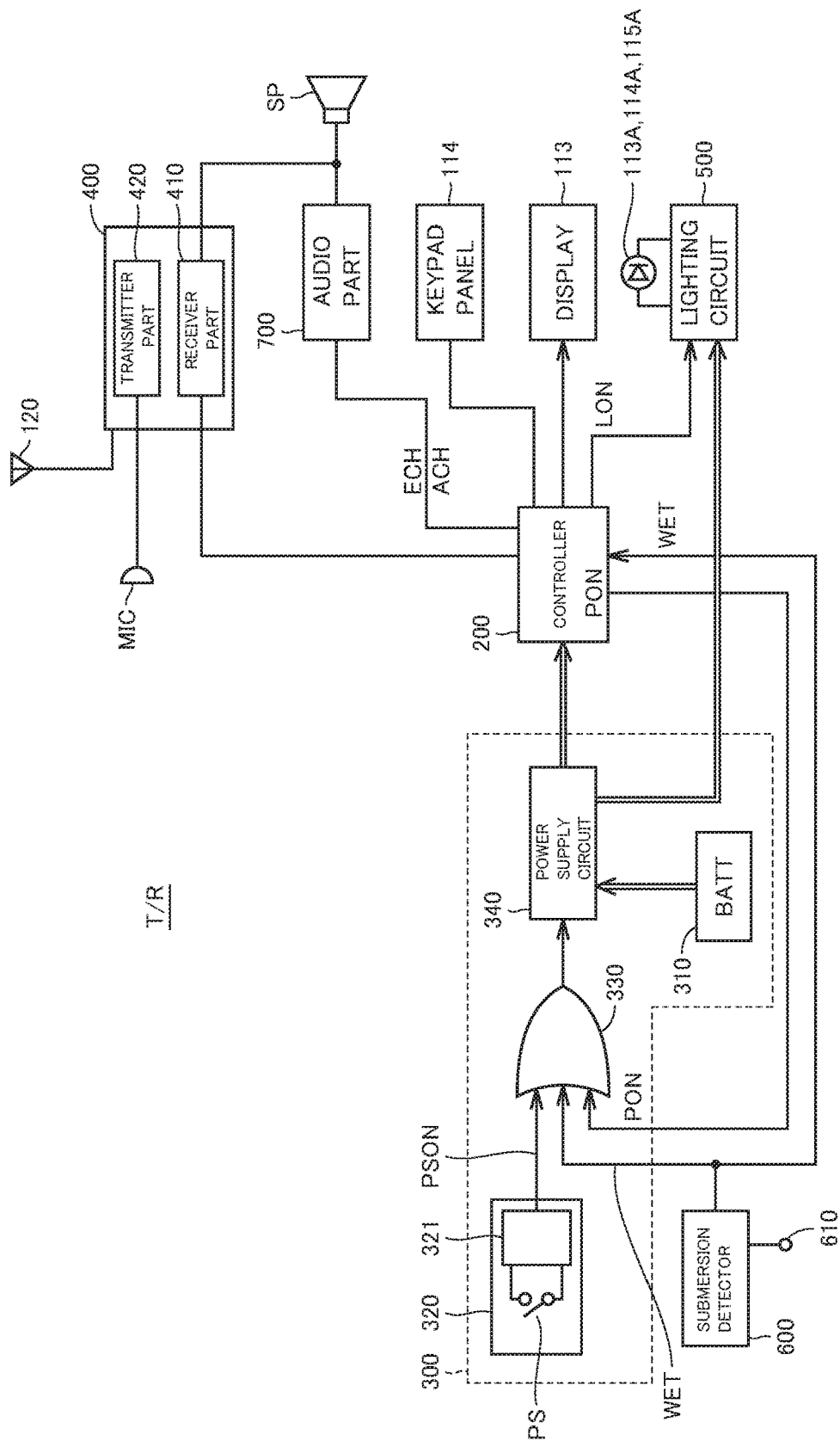
FIG. 2 is a block diagram showing a configuration of the transceiver.

An electronic device according to an embodiment of the invention is a transceiver T/R. The transceiver T/R includes a submersion detector 600, LEDs (illuminants) 113A, 114A, and 115A, a lighting circuit 500, a controller 200, and a power controller 300. The submersion detector 600 is configured to detect submersion of the transceiver and detect retrieval of the transceiver. As used herein the term "submersion" means that the electronic device/transceiver falls onto the surface of water or into water. As used herein the term "retrieval" means that the electronic device/transceiver is retrieved by a user from the surface of the water or from under the water. The LEDs 113A, 114A, and 115A are provided inside a casing 111 of the transceiver T/R. The lighting circuit 500 lights up the LEDs 113A, 114A, and 115A in response to an input of a lighting signal LON. The controller 200 is configured to generate a lighting signal LON and output the generated lighting signal LON to the lighting circuit 500 for a period of time from the submersion at least until the retrieval, thereby lighting up the LEDs 113A, 114A, and 115A. In a case where the controller 200 is not supplied with power when the submersion detector 600 detects submersion, the power controller 300 is configured to supply power to the controller 200 to activate the controller 200. In a case where the part of the transceiver T/R that is unnecessary for lighting the LEDs 113A, 114A, and 115A (hereinafter referred to as the "unnecessary part"), such as the communication part 400, is supplied with power when the submersion detector 600 detects submersion, the controller 200 stops the supply of power to the unnecessary part for a period of time from the submersion at least until the retrieval.

Figure 5:
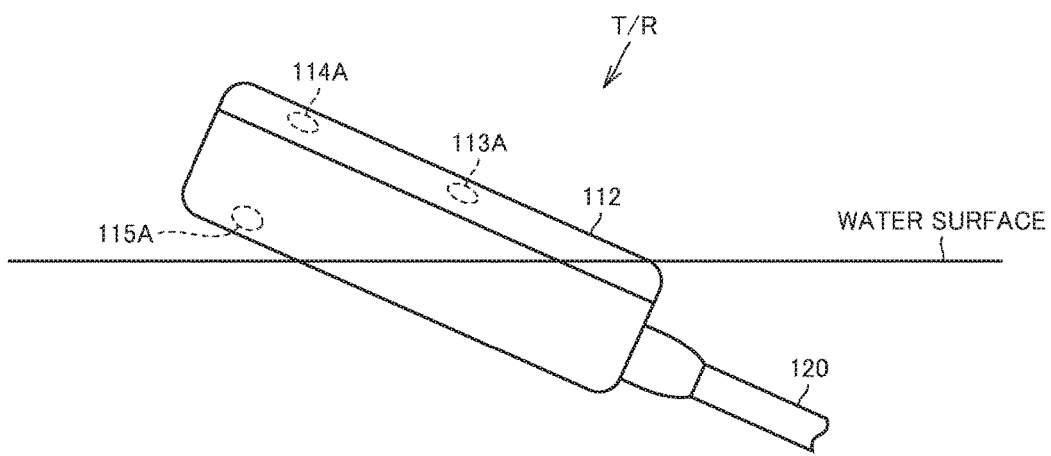
FIG. 5 is a schematic side view showing the transceiver in a submerged state.

Referring to the drawings, the following provides an overview of the transceiver T/R to which the invention is applied. The transceiver T/R is a hand-held device for marine communication adapted for wireless communication in a marine VHF radio band. The transceiver T/R in outward appearance has a body 110 and an antenna 120 on the top face of the body 110. The transceiver T/R is reduced in overall weight by using a light-weight and large-capacity power source, such as a lithium ion battery. The casing 111 of the body 110 is watertight. The reduced weight and water tightness allows the transceiver T/R to rise to the surface of water without sinking completely when falling into water. Due to its inner weight distribution, the transceiver T/R floats on water in an orientation as shown in FIG. 5, in which the antenna 120 points in an underwater direction.

The transceiver T/R is configured such that when submerged, it lights up the illuminants and simultaneously sounds an alarm to apprise a user of the submersion and the location of the transceiver. The transceiver T/R is also configured such that when retrieved from the submersion (when the retrieval occurs), the transceiver stops the lighting of the illuminants and the sounding of the alarm and emits a draining sound for draining water out of a speaker grille 112 of the body 110.

Next, the appearance of the transceiver T/R will be described in detail. As described above, the transceiver T/R has the body 110, which includes the casing 111, and the antenna 120 provided on the top face of the casing 111 and oriented upward. The antenna 120 is a rod-shaped antenna with a coiled antenna wire accommodated in a resin pipe. The antenna wire is a copper wire or an iron wire and thus relatively heavy. The weight of the antenna 120 causes an upward-biased weight distribution of the entire transceiver T/R.

The front face of the casing 111 is provided with a display 113, a keypad panel 114, and the speaker grille 112, from top to bottom in this order.

Provided inside the speaker grille 112 is a loudspeaker SP. Provided on the left side face of the casing 111 is a push-to-talk (PTT) switch 115. On the top face of the casing 111, provided to the left of the antenna 120 is an SP/MIC connector 116 covered with a watertight cap.

Provided in a central lower part on the rear face of the casing 111 is the LED 115A, which serves as an illuminant that lights up during the submersion. It should be noted that the LED 115A is located at a position (i.e. in the central lower part of the rear face) that allows the LED 115A to emerge from water when the transceiver T/R is submerged in a submersion orientation with its rear face facing upward. Accordingly, the LED 115A is useful in this submersion position.

The display 113 is a liquid crystal display, and the rear face thereof is provided with the LEDs 113A serving as backlights (see FIGS. 1A and 2). The display 113 can indicate communication channels, volume, and other various settings.

Disposed on the keypad panel 114 is a plurality of key switches including a power key PS and numeric keys. The power key PS is a key switch to turn the power on/off. When the power key PS is pressed for a predetermined period of time (e.g. for two seconds or longer) by a user, the power of the transceiver T/R is switched from on to off or from off to on. The keypad panel 114 is also provided on its rear face with the LEDs 114A serving as backlights (see FIGS. 1A and 2). The key switches of the keypad panel 114 have key tops of a material and a color that transmit light and are illuminated from the back by the lighting-up of the corresponding backlights 114A.

The above-described LEDs 113A serve two functions, namely as backlights of the display 113 and illuminants to light up during submersion. The above-described LEDs 114A also serve two purposes, namely as backlights of the keypad panel 114 and illuminants to light up during submersion.

A pair of electrodes 610 is provided in upper right and left portions of the rear face of the casing 111. The electrodes 610 form part of the submersion detector 600 and are brought into electrical conduction to each other by establishing a short circuiting via water when the transceiver T/R is submerged. The conduction of the electrodes 610 is used by the controller 200 of the transceiver T/R (see FIG. 2) to detect submersion of the transceiver T/R. It should be noted that the electrodes 610 become always short-circuited via water when the transceiver T/R is submerged for the following reasons: 1) the overall weight distribution of the transceiver T/R is upward-biased due to the weight of the antenna 120; and 2) the internal weight distribution is adjusted such that the transceiver T/R floats on water with the upper portion of the casing 111, which is provided with the antenna 120, pointing in a underwater direction.

Referring to the block diagram shown in FIG. 2, a circuit configuration of the transceiver T/R will be described. This figure shows some circuits of the transceiver T/R, particularly circuits related to power control, audio signal processing, and communication control.

The transceiver T/R includes the controller 200, the power controller 300, the communication part 400 including a receiver part 410 and a transmitter part 420, the lighting circuit 500, the submersion detector 600, and an audio part 700.

The controller 200 is a so-called microcontroller provided with memory, various interfaces, A/D and D/A converters, etc. in addition to a CPU. The controller 200 controls an entire operation of the transceiver T/R, including setting operations as shown in the timing charts in FIGS. 3 and 4. The controller 200 is also connected to the display 113 and the keypad panel 114. The controller 200 stores, in its memory, a control program for controlling the operation of the transceiver T/R.

The power controller 300 includes a battery 310 and controls supply of power to the controller 200, the communication part 400, the lighting circuit 500, and the display 113.

The receiver part 410 of the communication part 400 is a circuit to process reception of high-frequency signals and emission of audio signals. The loudspeaker SP is connected to the final stage of the receiver part 410. The loudspeaker SP is shared by the receiver part 410 and the audio part 700. The transmitter part 420 of the communication part 400 is a circuit to convert audio signals from a microphone MIC into transmission signals of high-frequency and transmit them through the antenna 120.

The lighting circuit 500 is a circuit to light the illuminants, such as the LEDs 113A, 114A, and 115A, in response to a lighting signal LON from the controller 200.

As described above, the LEDs 113A act as backlights of the display 113 and also as illuminants that light up to indicate the location of the transceiver T/R when it is submerged. The LEDs 114A act as backlights of the keypad panel 114 and also as illuminants that light up to indicate the location of the transceiver T/R when it is submerged. The LED 115A, provided on the back side of the casing 111, also acts as an illuminants that lights up to indicate the location of the transceiver T/R when it is submerged.

FIGS. 1A to 1C show two LEDs 113A, nine LEDs 114A, and one LED 115A, but the LEDs 113A and 114A may be of any number and luminance required to illuminate the display 113 and the keypad panel 114 in their entirety from the back. Also, the LED 115A may be of any number and luminance required to indicate the location of the transceiver T/R when it is submerged with the rear face facing upward.

The power controller 300 includes, in addition to the battery 310, a power switching circuit 320, an OR circuit 330, and a power supply circuit 340. The battery 310 may be e.g. a lithium ion battery, with voltage of e.g. 7.4 V.

The power switching circuit 320 has the above-described power key PS and a hold circuit 321. The hold circuit 321 can output a power switch-on signal PSON. The hold circuit 321 reverses the state (level high "H" or low "L") of the power switch-on signal PSON when the power key PS is kept activated for the predetermined period of time or longer. The power switch-on signal PSON will be input to the OR circuit 330.

The submersion detector 600 includes the pair of electrodes 610 described above and is configured to output a submersion signal WET. The submersion detector 600 lowers the submersion signal WET to a "low" level (level L) during the time when the pair of electrodes 610 is electrically conducted. The submersion signal WET is then input to the OR circuit 330 of the power controller 300 and the controller 200.

The OR circuit 330 is configured to receive, in addition to the power switch-on signal PSON and the submersion signal WET, a power maintaining signal PON from the controller 200.

An output from the OR circuit 330 is input to the power supply circuit 340. When receiving a "high" (H) signal from the OR circuit 330, the power supply circuit 340 powers the controller 200, the communication part 400, and the lighting circuit 500 from the battery 310 so as to power on the transceiver T/R.

The lighting circuit 500 is configured to light the illuminants, such as the LEDs 113A, 114A, and 115A, in response to a lighting signal LON at a "high" level (level H) input from the controller 200, i.e. in response to an input of an H signal of a lighting signal LON. When the controller 200 maintains a lighting signal LON at level H, the LEDs 113A, 114A, and 115A remains illuminated. When the controller 200 periodically switches a lighting signal LON between level H and L, the LEDs 113A, 114A, and 115A flash on and off. When a user turns on the backlights via the keypad panel 114, the controller 200 raises the lighting signal LON to level H to light up the LEDs 113A, 114A, and 115A.

When the transceiver T/R is submerged to cause the submersion signal WET from the submersion detector 600 to change from level H to level L, the controller 200 changes the lighting signal LON between level H and L at predetermined flashing intervals to flash the LEDs 113A, 114A, and 115A on and off. When the transceiver T/R is retrieved and the submersion signal WET from the submersion detector 600 changes from level L to level H, the controller 200 continues to flash the LEDs 113A, 114A, and 115A on and off for a predetermined flashing duration. It should be noted that the flashing intervals of the LEDs 113A, 114A, and 115A during submersion and the flashing duration after retrieval may be set by a user as desired.

The audio part 700 is configured to emit an alarm sound upon receiving an alarm sound generation signal ACH, which is generated by and output from the controller 200 when the submersion signal WET from the submersion detector 600 changes from level H to level L. The alarm sound is an intermittently emitted sound that is generated when the transceiver T/R is submerged. The alarm sound may be a sinusoidal wave of about 1 kHz, which can be easily recognized by human hearing. The alarm sound may be at a maximum level or may be set to an appropriate level to inform a user of the location with reduced exhaustion of the battery 310.

The draining sound is generated during a draining operation of the loudspeaker grille and may be a rectangular wave of 300 Hz. The frequency and the waveform of the draining sound can be determined appropriately in accordance with the characteristics of the loudspeaker SP, the volume of the speaker grille 112, the shape of the transceiver T/R, and other conditions. It is preferable to use a rectangular wave or a sawtooth wave between 100 Hz and 500 Hz.

The controller 200 is activated by being supplied with power voltage from the power controller 300 and configured to control the operation of the transceiver T/R. The controller 200, in particular, can monitor input change of the submersion signal WET from the submersion detector 600 at predetermined time intervals, e.g. every 10 milliseconds (ms), and executes operations below. The following describes the operations, with reference to FIGS. 3 and 4, in a case where both submersion notification operations, i.e. the flashing of the LEDs 113A, 114A, and 115A and the emission of the alarm sound, are turned on.

Case of Submersion in Power-On State

Figure 3:
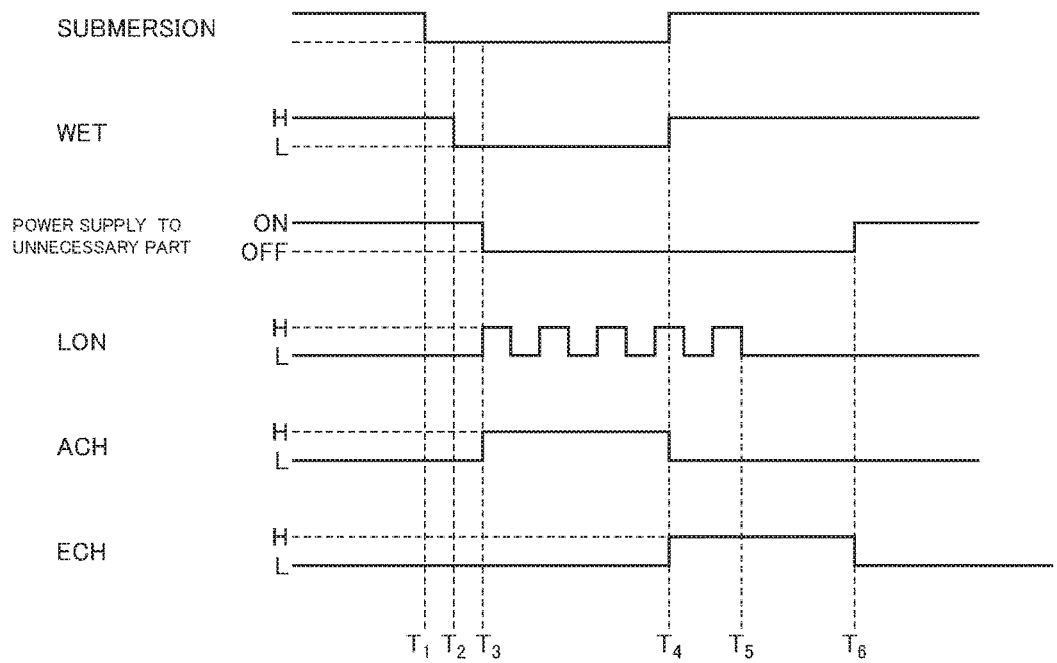
FIG. 3 is a timing chart showing operations of components of the transceiver in a case where the transceiver is powered on when submerged.

When the transceiver T/R is submerged at T1 shown in FIG. 3, the submersion signal WET input into the controller 200 from the submersion detector 600 changes from level H to level L within 10 ms at T2 shown in FIG. 3. In response to the change from level H to level L of the submersion signal WET, the controller 200 determines that the transceiver T/R has been submerged and performs the following operations:

(1) Flashing the LEDs 113A, 114A, and 115A.

At T3 shown in FIG. 3, the illuminants, such as the LEDs 113A, 114A, and 115A, start flashing on and off. For the flashing of the LEDs 113A, 114A, and 115A, the controller 200 switches a lighting signal LON between level H and L at predetermined intervals, and the signal is input to the lighting circuit 500. When the lighting signal LON changes to level H, the lighting circuit 500 lights up the LEDs 113A, 114A, and 115A, while when the lighting signal LON changes to level L, the lighting circuit 500 turns off the LEDs 113A, 114A, and 115A. In accordance with alternation of level H and L of the lighting signal LON repeated at the predetermined intervals, the LEDs 113A, 114A, and 115A flash on and off.

(2) Emitting alarm sound

At T3 shown in FIG. 3, the emission of the alarm sound is started. To emit the alarm sound, the controller 200 changes the alarm sound generation signal ACH from level L to level H, and the signal is input to the audio part 700. The loudspeaker SP then emits the alarm sound. When water is not completely clogging the inside of the speaker grille 112, the alarm sound is emitted to the outside to reach the user.

(3) If a submersion occurs in the power-on state, at T3 shown in FIG. 3, the controller 200 stops power supply to the parts other than parts related to the flashing of the LEDs 113A, 114A, and 115A and the emission of the alarm sound as described above. These parts will be herein referred to collectively as an "unnecessary part." The unnecessary part in this embodiment corresponds to the communication part 400 and parts to display various settings such as communication channels on the display 113.

(4) The controller 200 stores information, in a recording part, on the state of the communication part 400 immediately before the submersion. Such information may include frequencies used for communications. The recording part may be a memory of the controller 200 or may be a recording part other than this memory.

At T4 in FIG. 3, when the transceiver T/R submerged is retrieved from the water, the submersion signal WET changes from level L to level H. In response to this, the controller 200 performs the following operations:

(1) Stopping the alarm sound

At T4 in FIG. 3, the controller 200 changes the alarm sound generation signal ACH from level H to level L to stop the emission of the alarm sound. At the same time, the controller 200 emits a draining sound. Specifically, the controller 200 changes a draining sound generation signal ECH from level L to level H to emit the draining sound, and the signal is input to the audio part 700.

(2) Starting measurements of the flashing duration of the LEDs 113A, 114A, and 115A and others.

At T4 in FIG. 3, the controller 200 starts an LED timer to measure a flashing duration of the LEDs 113A, 114A, and 115A and a draining sound timer to measure a draining sound duration during which the draining sound is emitted.

At T5 when the flashing duration has elapsed, i.e. when the time of the LED timer is up, the lighting signal LON is stopped (i.e. the lighting signal LON is set to level L), so that the LEDs 113A, 114A, and 115A stop lighting. At T6 when the draining sound duration has elapsed, i.e. when the time of the draining sound timer is up, the draining sound generation signal ECH is stopped (i.e. the draining sound generation signal ECH is set to level L), so that the emission of the draining sound stops.

The draining sound duration may be determined appropriately in accordance with conditions such as the characteristics of the loudspeaker SP, the volume inside the speaker grille 112, and the shape of the transceiver T/R. The duration is suitably about ten seconds, for example. The draining sound duration may be set by a user as desired.

(3) Returning to the state immediately before the submersion

When the LEDs 113A, 114A, and 115A stop lighting and the emission of the draining sound stops, i.e. at T6 shown in FIG. 3, the controller 200 restores the state of the communication part 400 to the stored state at the time immediately before the submersion, referring to information on the state of the communication part 400 before the submersion on the recording part. This allows the user to immediately resume using the transceiver T/R.

Case of Submersion in Power-Off State

Figure 4:
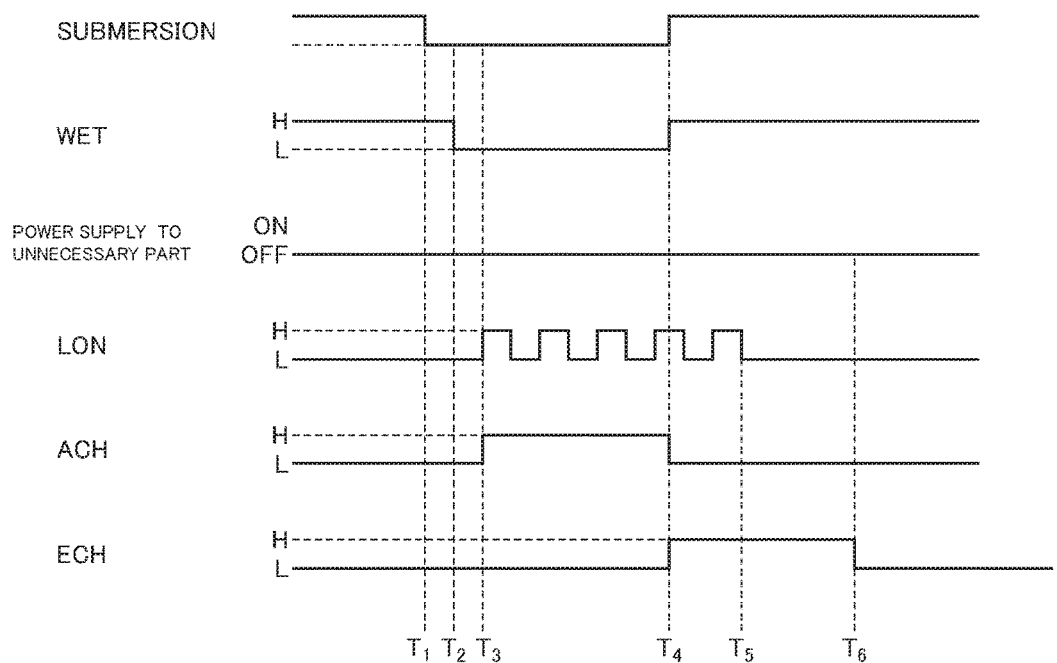
FIG. 4 is a timing chart showing operations of the components of the transceiver in a case where the transceiver is powered off when submerged.

Even in the power-off state, when the transceiver T/R is submerged at T1 shown in FIG. 4, and the submersion signal WET changes from level H to level L at T2 shown in FIG. 4, the output of the OR circuit 330 changes from level L to level H, and power of the battery 310 is supplied to the controller 200 via the power supply circuit 340. It may be configured such that when power is supplied to the controller 200, power may also be supplied to the lighting circuit 500, the LEDs 113A, 114A, and 115A, the audio part 700 and the loudspeaker SP. Alternatively, it may be configured such that power is supplied to the lighting circuit 500, the LEDs 113A, 114A, and 115A, the audio part 700 and the loudspeaker SP even when the transceiver T/R is powered off. In either case, the controller 200 supplied with power starts at T3 shown in FIG. 3 to make the LEDs 113A, 114A, and 115A flash on and off and make the alarm sound be emitted.

It should be noted that, in the case where the transceiver T/R was powered off when submerged, power has not been supplied from the beginning to the unnecessary part (such as the communication part 400), i.e. parts other than parts related to the flashing of the LEDs 113A, 114A, and 115A and the emission of the alarm sound. Accordingly, there will be no operation for stopping power supply to the unnecessary part.

At T4 in FIG. 4 when the transceiver T/R is retrieved from the water, and the submersion signal WET input to the controller 200 from the submersion detector 600 changes from level L to level H, the controller 200 determines that the transceiver T/R has been retrieved from the water surface and performs the following operations:

At T4 shown in FIG. 4, the alarm sound generation signal ACH is changed from level H to level L to stop the emission of the alarm sound, and instead the draining sound generation signal ECH is changed from level L to level H to emit the draining sound. Simultaneously started is the measurements of the flashing duration of the LEDs 113A, 114A, and 115A and others. Accordingly, at T5 shown in FIG. 4 when the flashing duration has elapsed, the LEDs 113A, 114A, and 115A stop lighting. At T6 shown in FIG. 4 when the draining sound duration has elapsed, the draining sound stops.

It should be noted that the transceiver T/R is already powered off when submerged, and the power accordingly remains off even after the draining sound stops at T6.

It should also be noted that whether the transceiver T/R becomes submerged in the power-on state or the power-off state, power will not be supplied to the communication part 400. Therefore, it is possible to reduce power consumption by about 90% compared to conventional devices.

In the above-described embodiment, the LEDs 113A used as the backlight set for the display 113 and the LEDs 114A used as the backlight set for the keypad panel 114 are also used as illuminants, but the present invention is not limited to this. It is obviously possible to use only one of the LED sets may be used as the illuminants or to provide a dedicated separate illuminant, such as the LED 115A.

The LEDs 113A, 114A, and 115A flash on and off as illuminants during submersion in the above embodiment. Alternatively, they may be continuously lighted. An illuminant of other kind than LEDs may be adopted.

The lighting operation of the LEDs 113A, 114A, and 115A and the emission operation of the alarm sound are performed simultaneously in the above embodiment. Alternatively, only one of these operations may be performed. A user may choose which operation to perform.

The transceiver T/R in the above embodiment emits the draining sound after retrieval. It is obviously possible to configure the transceiver T/R such as to emit no draining sound.

The electronic device in the above embodiment is a hand-held transceiver for marine communication, but this is just as an example and not limited thereto. The electronic device of the invention may be, for example, a stationary transceiver, a mobile phone or radio receiver commonly available, or a personal computer, or the like.

The audio part 700 is provided in the above embodiment for emitting the alarm sound and the draining sound. The audio part 700 may also be omitted, in which case a substitute for the audio part 700 may be a latter part of the receiver part 410 of the communication part 400, specifically, an amplification unit or the like to emit sound in response to the alarm sound generation signal ACH and the draining sound generation signal ECH from the controller 200. In this case, modification should be made such that, instead of cutting off power supply to the entire communication part 400 upon the detention of submersion, power should be supplied to the amplification unit etc. to perform sound emission in response to the alarm sound generation signal ACH and the draining sound generation signal ECH.

The controller of the invention may be configured such as to supply power only to parts necessary to light the illuminants, e.g. the illuminants and the lighting circuit, at least for a period of time between submersion and retrieval upon detection of the submersion by the submersion detector. Alternatively, the controller of the invention may be configured such as to supply power only to parts necessary to light the illuminants, e.g. the illuminants and the lighting circuit, and to parts necessary to generate an alarm sound, e.g. the audio part 700 and the loudspeaker SP, at least for a period of time between submersion and retrieval upon detection of the submersion by the submersion detector.

The present invention can include any combination of these various features or embodiments above and/or below as set-forth in sentences and/or paragraphs. Any combination of disclosed features herein is considered part of the present invention and no limitation is intended with respect to combinable features.

The entire contents of all references cited in this disclosure are incorporated herein in their entireties, by reference. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether such ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

REFERENCE SIGNS LIST

113A: LED (illuminant)
114A: LED (illuminant)
115A: LED (illuminant)
200: controller
300: power controller
500: lighting circuit
600: submersion detector
610: electrode

What is claimed is:

1. An electronic device comprising:
a submersion detector configured to detect submersion of the electronic device and output a first submersion signal and also configured to detect retrieval of the electronic device and output a second submersion signal, wherein the submersion means that the electronic device itself falls onto a surface of water or into water, and the retrieval means that the electronic device itself is retrieved from the surface of the water or from under the water;
an illuminant provided inside a casing;
a lighting circuit configured to light the illuminant in response to an input of a lighting signal;
a controller configured to light the illuminant by generating and outputting the lighting signal to the lighting circuit at least for a period of time from a point in time when the controller receives the first submersion signal until a point in time when the controller receives the second submersion signal;
an unnecessary part that is unnecessary for lighting the illuminant of the electronic device; and
a power controller,
wherein the electronic device is configured such that,
in a case where the power controller is supplying power to the controller, the lighting circuit, and the unnecessary part when the controller receives the first submersion signal, the controller stops the supply of the power to the unnecessary part at least for the period of time, and
in a case where the power controller is supplying power to neither the controller, the lighting circuit, nor the unnecessary part when the power controller receives the first submersion signal, the power controller supplies power to the controller, and the controller supplied with power receives the first submersion signal, generates the lighting signal and outputs the generated lighting signal to the lighting circuit at least for the period of time, and thereby lights the illuminant, while the controller also continues to maintain the unnecessary part powered off at least for the period of time.

2. The electronic device according to claim 1, further comprising:
a display; and
a keypad panel,
wherein the illuminant is a backlight of at least one of the display and the keypad panel.

3. The electronic device according to claim 1, wherein the submersion detector includes a pair of electrodes and is configured to output the first submersion signal by means of electrical conduction between the electrodes and later output the second submersion signal by means of nonconduction between the electrodes.

4. The electronic device according to claim 2, wherein the submersion detector includes a pair of electrodes and is configured to output the first submersion signal by means of electrical conduction between the electrodes and later output the second submersion signal by means of nonconduction between the electrodes.

5. The electronic device according to claim 1, further comprising:
a recording part,
wherein the unnecessary part includes a communication part, and
wherein the electronic device is configured such that, in a case where the power controller is supplying power to the controller, the lighting circuit, and the unnecessary part when the controller receives the first submersion signal, the controller stops power supply to the unnecessary part at least for the period of time and stores, in the recording part, information on a state of the communication part immediately before the submersion.

6. The electronic device according to claim 2, further comprising:
a recording part,
wherein the unnecessary part includes a communication part, and
wherein the electronic device is configured such that, in a case where the power controller is supplying power to the controller, the lighting circuit, and the unnecessary part when the controller receives the first submersion signal, the controller stops power supply to the unnecessary part at least for the period of time and stores, in the recording part, information on a state of the communication part immediately before the submersion.

7. The electronic device according to claim 3, further comprising:
a recording part,
wherein the unnecessary part includes a communication part, and
wherein the electronic device is configured such that, in a case where the power controller is supplying power to the controller, the lighting circuit, and the unnecessary part when the controller receives the first submersion signal, the controller stops power supply to the unnecessary part at least for the period of time and stores, in the recording part, information on a state of the communication part immediately before the beginning of the electrical conduction of the electrodes.

8. The electronic device according to claim 4, further comprising:
a recording part,
wherein the unnecessary part includes a communication part, and
wherein the electronic device is configured such that, in a case where the power controller is supplying power to the controller, the lighting circuit, and the unnecessary part when the controller receives the first submersion signal, the controller stops power supply to the unnecessary part at least for the period of time and stores, in the recording part, information on a state of the communication part immediately before the beginning of the electrical conduction of the electrodes.

9. The electronic device according to claim 5, wherein the electronic device is configured such that, when the controller receives the second submersion signal, the controller restores the communication part to a state immediately before the submersion, referring to the information on the state of the communication part, the information having been stored on the recording part.

10. The electronic device according to claim 6, wherein the electronic device is configured such that, when the controller receives the second submersion signal, the controller restores the communication part to a state immediately before the submersion, referring to the information on the state of the communication part, the information having been stored on the recording part.

11. The electronic device according to claim 7, wherein the electronic device is configured such that, when the controller receives the second submersion signal, the controller restores the communication part to a state immediately before the beginning of the electrical conduction of the electrodes, referring to the information on the state of the communication part, the information having been stored on the recording part.

12. The electronic device according to claim 8, wherein the electronic device is configured such that, when the controller receives the second submersion signal, the controller restores the communication part to a state immediately before the beginning of the electrical conduction of the electrodes, referring to the information on the state of the communication part, the information having been stored on the recording part.

13. The electronic device according to claim 1, wherein the unnecessary part comprises a communication part having a receiver and a transmitter.

14. The electronic device according to claim 1, wherein the unnecessary part comprises a display.

15. The electronic device according to claim 1, further comprising a loudspeaker and an audio part, wherein
the audio part is configured to make the loudspeaker emit an alarm sound in response to an input of an alarm sound generation signal, and
the controller is configured such that, when the controller receives the first submersion signal, the controller controls supply of power to the illuminant, the lighting circuit, the audio part, and the speaker, generates and outputs the lighting signal to the lighting circuit, and generates and outputs the alarm sound generation signal to the audio part, at least for the period of time, and
the unnecessary part is the part that is unnecessary for lighting the illuminant of the electronic device and for emitting an alarm sound.

16. The electronic device of claim 1, wherein the power controller is configured to supply power to the controller, the controller is configured to control power to the unnecessary part, and the unnecessary part is configured to be powered only through the controller and not directly by the power controller.

17. A method of controlling an electronic device, comprising:
- operating a submersion detector of the electronic device to send a first submersion signal to a controller and a power controller of the electronic device in a case where the submersion detector detects submersion of the electronic device;
- operating the submersion detector to send a second submersion signal to the controller and the power controller in a case where the submersion detector detects retrieval of the electronic device from the submersion;
- operating the controller to send a lighting signal, which is for lighting an illuminant provided inside a casing of the electronic device, to a lighting circuit of the electronic device at least for a period of time from a point in time when the controller receives the first submersion signal until a point in time when the controller receives the second submersion signal in a case where the controller receives the first submersion signal;
- operating the lighting circuit to light the illuminant when the lighting circuit receives the lighting signal; and
- operating the controller to stop power supply to an unnecessary part that is unnecessary for lighting the illuminant at least for the period of time in a case where the power controller is supplying power to the controller, the lighting circuit, and the unnecessary part when the controller receives the first submersion signal, and
- in a case where the power controller is supplying power to neither the controller, the lighting circuit, nor the unnecessary part when the power controller receives the first submersion signal, operating the power controller to supply the controller with power to allow the controller supplied with power to receive the first submersion signal, generate the lighting signal and output the generated lighting signal to the lighting circuit at least for the period of time, and thereby light the illuminant, and also to allow the controller to maintain the unnecessary part powered off at least for the period of time.

* * * * *